(12) United States Patent
Lebrun

(10) Patent No.: US 8,221,081 B2
(45) Date of Patent: Jul. 17, 2012

(54) TURBOMACHINE HAVING AN UNDUCTED FAN PROVIDED WITH AIR GUIDE MEANS

(75) Inventor: Maxime Lebrun, Saint Maur des Fosses (FR)

(73) Assignee: SNECMA, Paris (FR)

( * ) Notice: Subject to any disclaimer, the term of this patent is extended or adjusted under 35 U.S.C. 154(b) by 341 days.

(21) Appl. No.: 12/617,222

(22) Filed: Nov. 12, 2009

(65) Prior Publication Data

US 2010/0124500 A1 May 20, 2010

(30) Foreign Application Priority Data

Nov. 14, 2008 (FR) .................................... 08 06380

(51) Int. Cl.
*B64C 11/48* (2006.01)
(52) U.S. Cl. .................................... 416/129; 416/236 R
(58) Field of Classification Search .................. 416/129, 416/238, 235, 236 R, 236 A
See application file for complete search history.

(56) References Cited

U.S. PATENT DOCUMENTS

| 3,776,363 | A | | 12/1973 | Kuethe | |
|---|---|---|---|---|---|
| 4,265,596 | A | * | 5/1981 | Katagiri et al. | 416/236 A |
| 5,190,441 | A | * | 3/1993 | Murphy et al. | 416/129 |

FOREIGN PATENT DOCUMENTS

| JP | 58067999 A | * | 4/1983 |
|---|---|---|---|
| JP | 7-10089 | | 1/1995 |

OTHER PUBLICATIONS

JP 58-67999 A. Schreiber Translations, Inc. Dec. 2011, 8 pages.*
James H. Dittmar, "Some Design Philosophy for Reducing the Community Noise of Advanced Counter-Rotation Propellers", NASA Technical Memorandum, Scientific and Technical Information, vol. TM-87099, XP009118109, Aug. 1, 1985, 30 pages.

* cited by examiner

*Primary Examiner* — Richard Edgar
(74) *Attorney, Agent, or Firm* — Oblon, Spivak, McClelland, Maier & Neustadt, L.L.P.

(57) ABSTRACT

A turbomachine having two unducted external fans mounted to contrarotate about a common axis, the fans constituting respectively an upstream fan and a downstream fan, is disclosed. At least some of the blades of the upstream fan carry an air guide device on their radially outer end portions, the air guide device being outwardly oriented on going from upstream to downstream and serving to deflect the vortices that are formed in the vicinity of the blade tips of the upstream fan radially to outside the blades of the downstream fan.

9 Claims, 3 Drawing Sheets

TURBOMACHINE HAVING AN UNDUCTED FAN PROVIDED WITH AIR GUIDE MEANS

FIELD OF THE INVENTION

The present invention relates to a turbomachine of the type having unducted fans (also known as "open rotors").

BACKGROUND OF THE INVENTION

A turbomachine of this type has two external fans mounted for contrarotation about a common axis, constituting respectively an upstream fan and a downstream fan, each fan being constrained to rotate with a turbine of the turbomachine and each extending substantially radially outside the nacelle of the turbomachine. Such a turbomachine has the advantage of providing very high performance compared with other types of turbomachine since it consumes less fuel and since its contrarotating fans enable it to deliver a high level of thrust.

Nevertheless, a major drawback of that type of turbomachine is the noise that it generates in operation. Unfortunately, such a turbomachine must comply with relatively severe acoustic certification standards, in particular during the take-off and landing stages of an airplane fitted with such a turbomachine.

One of the sources of the noise comes from vortices that are generated at the tips of the blades of the upstream fan interacting with the blades of the downstream fan.

One solution for eliminating the noise is to reduce the outside diameter of the downstream fan so that the vortices generated by the upstream fan pass outside the downstream fan and do not interact therewith. That solution is known as "clipping". Nevertheless, that solution is not satisfactory in that it leads to a reduction in the thrust produced by the downstream fan and thus to a reduction in the performance of the turbomachine. It would be possible to increase the load on the downstream fan in order to compensate the reduction in its diameter, but then the fan would become very complex to make.

OBJECT AND BRIEF SUMMARY OF THE INVENTION

A particular object of the invention is to provide a solution to this problem that is simple, effective, and inexpensive.

To this end, the invention provides a turbomachine having two unducted external fans mounted to contrarotate about a common axis, the fans constituting respectively an upstream fan and a downstream fan, wherein at least some of the blades of the upstream fan carry air guide means on their radially outer end portions, the air guide means being outwardly oriented on going from upstream to downstream and serving to deflect the vortices that are formed in the vicinity of the blade tips of the upstream fan radially to outside the blades of the downstream fan.

The guide means carried by the blades of the upstream fan guide at least a fraction of the vortices formed at the tips of the blades of the upstream fan in an outward direction so that they interact little or not at all with the blades of the downstream fan, thereby enabling the noise associated with said vortices interacting with the downstream fan to be reduced significantly (a reduction of up to 3 decibels (dB)). They also enable the intensity of the generated vortices to be reduced, thereby further contributing to noise reduction. The invention therefore does not require the dimensions of the upstream and downstream fans to be modified so they may have substantially the same outside diameter.

According to another characteristic of the invention, the guide means of a blade comprise at least one fin projecting from the suction side of the blade and/or at least one fin projecting from the pressure side of the blade.

The guide means of the invention are lightweight and they modify the aerodynamic profile of the blade little or not at all. Each fin may be formed integrally with the blade or else the fin may be a fitting that is fastened thereto. By way of example, it may be adhesively bonded to the blade or it may be fastened by any other appropriate technique. The fin may be obtained by casting, or indeed by machining. It may also be made of a composite material, of metal, etc.

The fin may be rectilinear in shape or it may be curved completely or in part. By way of example, it may have an axial dimension or length that lies in the range about 20% to about 90% of the axial dimension or length of the blade, and it may have a thickness or height that is constant or varying, approximately equal to the thickness or height of the boundary layer on the blade, while not exceeding about 20 millimeters (mm), for example. The thickness of the fin is a function of the material from which it is made. It is at least 1 mm.

In an embodiment of the invention, the blade carries a plurality of fins on at least one of its faces, the fins being substantially parallel to one another. They may be located close to the leading edge and/or to the trailing edge of the blade. By way of example, they may be distributed over a zone occupying about 50% to about 95% of the radial dimension of the blade as measured from the root of the blade. The pitch between the fins may either be constant or it may vary with height. Under such circumstances, it lies in the range 5 mm to 150 mm. The fins present an axial dimension or length that is either constant, or else that varies, increasing with increasing distance of the fins from the axis of rotation. The fins are not necessarily perpendicular to the surface of the blades.

The invention also provides an external fan blade for a turbomachine as described above, the fan blade including, at its outer end, parallel fins projecting from at least one of its faces and extending outwards on going from upstream to downstream.

BRIEF DESCRIPTION OF THE DRAWINGS

The invention can be better understood and other details, characteristics, and advantages of the present invention appear more clearly on reading the following description made by way of non-limiting example and with reference to the accompanying drawings, in which.

MORE DETAILED DESCRIPTION

Figure 1:
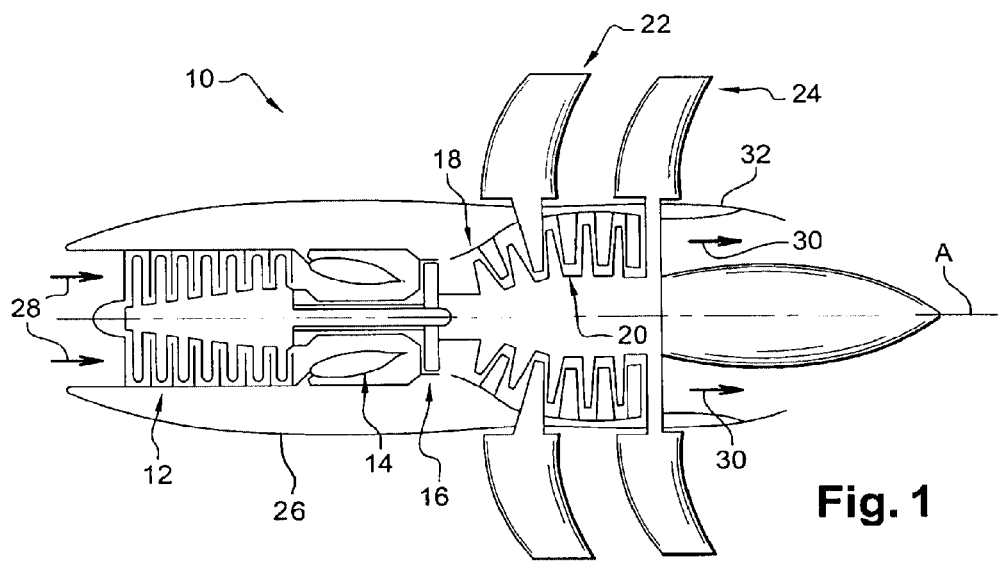
FIG. 1 is a diagrammatic axial section view of a turbomachine having unducted fans.

Reference is made initially to FIG. 1, which shows a turbomachine 10 having unducted fans (also known as "open rotors"), the turbomachine comprising from upstream to downstream in the flow direction of gas through the turbomachine: a compressor 12; an annular combustion chamber 14; an upstream high pressure turbine 16; and two low pressure downstream turbines 18 and 20 that are contrarotating, i.e. that turn in two opposite directions about the longitudinal axis A of the turbomachine.

Each of the downstream turbines 18 and 20 is constrained to rotate with an external fan 22, 24 that extends radially outside the nacelle 26 of the turbomachine, said nacelle 26 being substantially cylindrical and extending along the axis A around the compressor 12, the combustion chamber 14, and the turbines 16, 18, and 20.

The stream of air 28 that penetrates into the compressor 12 is compressed and is then mixed with fuel and burnt in the combustion chamber 14, the combustion gas then being injected into the turbines to drive the fans 22 and 24 in rotation, which fans deliver the major fraction of the thrust generated by the turbomachine. The combustion gas leaves the turbines and is expelled through a nozzle 30 (arrows 32) so as to increase thrust.

The fans 22 and 24 are disposed one behind the other on the same axis. In known manner, each fan 22, 24 comprises a plurality of blades that are regularly distributed around the axis A of the turbomachine, each blade extending substantially radially and having an upstream leading edge, a downstream trailing edge, a radially inner end forming the blade root, and a radially outer end forming the blade tip.

The downstream fan 24 has substantially the same diameter as the upstream fan 22 such that the two fans deliver the same thrust in operation and all of the stream of air that is compressed by the upstream fan is recompressed by the downstream fan.

Figure 2:
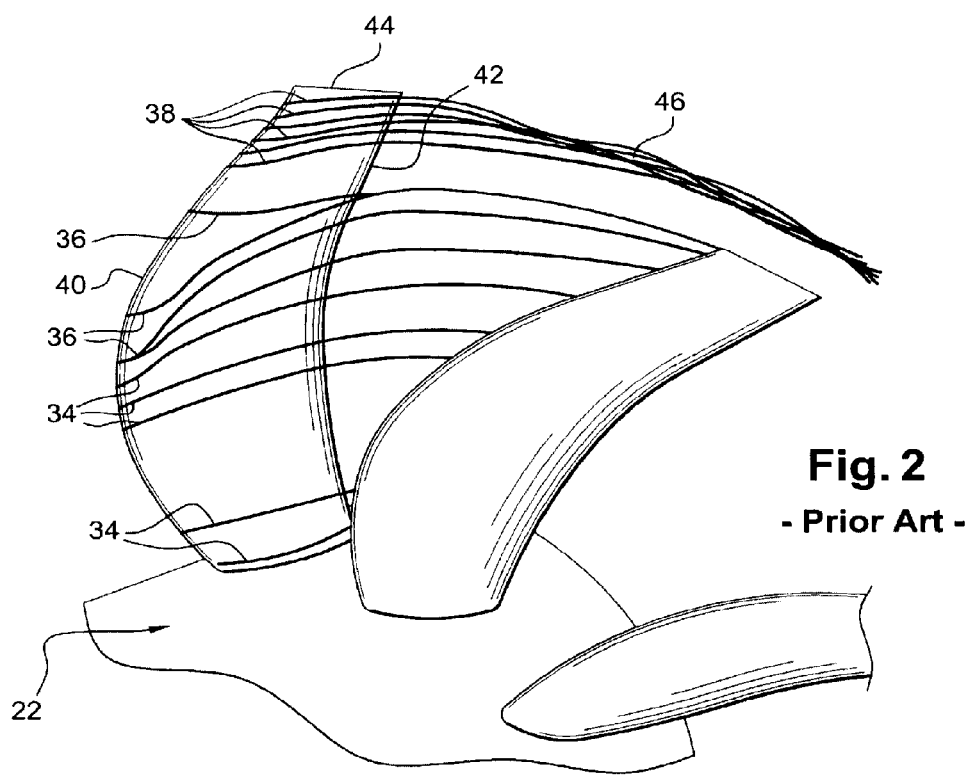
FIG. 2 is a fragmentary diagrammatic view in perspective of an upstream unducted fan in accordance with the prior art.

FIG. 2 is a fragmentary diagrammatic view in perspective of the upstream fan 22 of a prior art turbomachine, and it shows how streamlines vary around a blade of the fan. The streamlines 34, 36, 38 pass between the blades of the fan and they follow the profiles of the blades to a greater or lesser extent, going from the leading edges 40 to the trailing edges 42 of the blades.

The streamlines 34 that pass over the radially inner end portions of the blades are substantially parallel to one another. In contrast, the streamlines 36, 38 that pass over the radially outer ends tend to converge towards one another, with this phenomenon being of increasing intensity on coming closer to the tips 44 of the blades. The streamlines 36 at the blade tips wind around one another and form turbulent vortices 46 that impact against the blades of the downstream fan 24, where such impacts give rise to very high levels of noise.

The invention enables this problem to be remedied by means that are provided on the radially outer end portions of the blades of the upstream fan 22 that serve to guide the vortices 46 outwards and to force them to pass radially outside the blades of the downstream fan 24, while reducing the intensity of the vortices.

In the examples shown in the drawings and described below, the guide means comprise fins that project from the pressure sides and/or the suction sides of the blades of the upstream fan.

Figure 3:
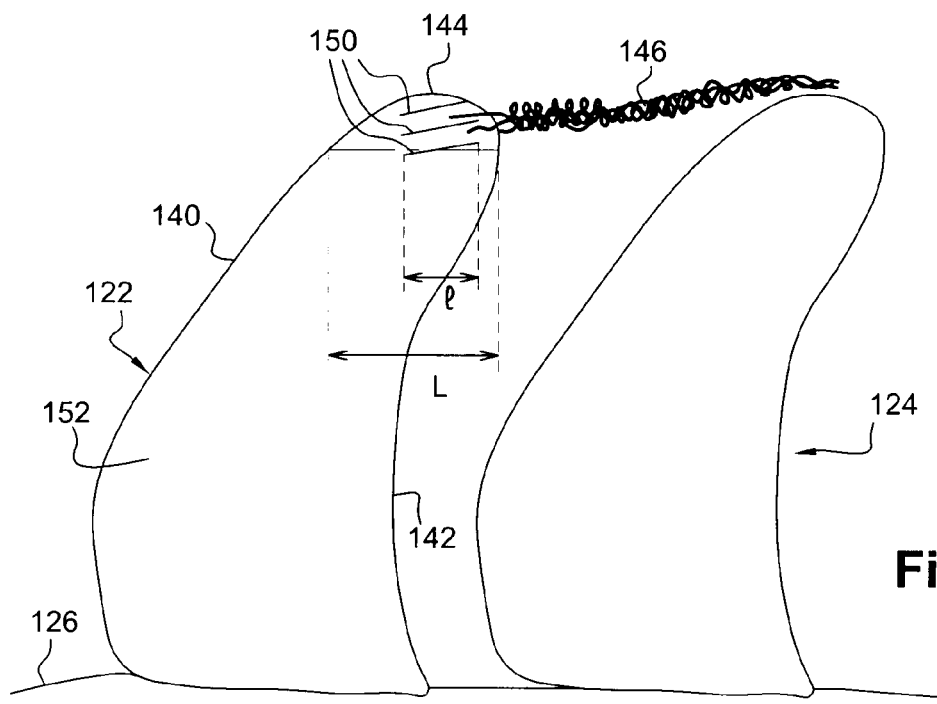
FIG. 3 is a highly diagrammatic half-view in axial section of a turbomachine having unducted fans in accordance with the invention.

As shown in FIG. 3, each blade of the upstream fan 122 includes, in the vicinity of its tip 144, three fins 150 that are substantially identical and parallel to one another. They are axially distant from the leading edges 140 and the trailing edges 142 of the blades. In the example shown, these fins 150 are rectilinear and they slope radially outwards going from upstream to downstream. The fins 150 are situated on the suction side 152 of the blades and they extend outwards from upstream to downstream so as to guide and deflect the vortices 146 outwards, beyond the tips of the blades of the downstream fan 124.

In this example, the fins 150 present an axial dimension or length l lying in the range about 50% to about 90% of the local axial length L of the blade, i.e. the length of the blade measured level with the fins.

Figures 4, 5, 6:
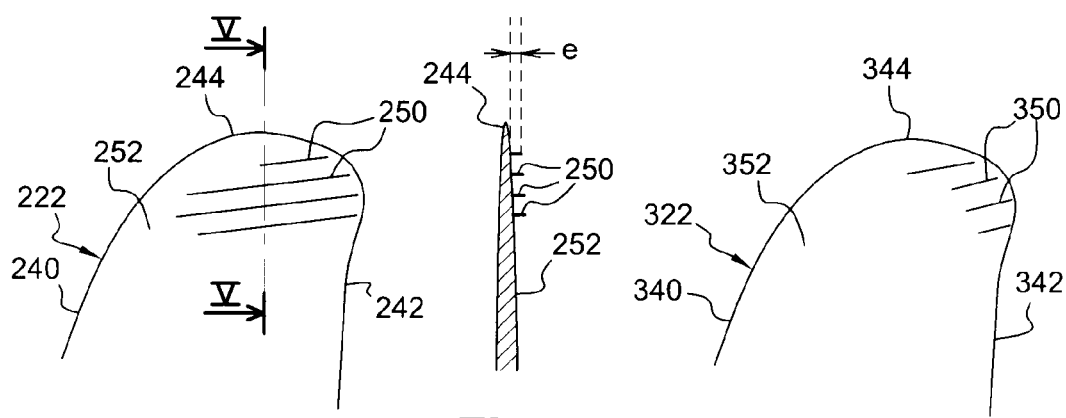
FIG. 4 is a fragmentary diagrammatic side view of an upstream fan blade in a variant embodiment of the invention.
FIG. 5 is a section view on line V-V of FIG. 4.
FIGS. 6 to 8 are views corresponding to FIG. 4 and showing other variant embodiments of the invention.

In the variant embodiment shown in FIGS. 4 and 5, the blade has four parallel fins 250 on its suction side 252 in the vicinity of its tip 244. These fins are rectilinear and extend axially upstream from the trailing edges 242 of the blades over a distance that corresponds to about 50% to 80% of the local axial dimension or length of the blade. The fin closest to the blade tip 244 is shorter than the other fins.

The fins 250 and the fins 150 are of a height or thickness e that is relatively small and that is less than or equal to the height or thickness of the boundary layers on the blades so that the fins do not impede or modify the flow of the air stream between the blades. The thickness e of the fins lies, for example, in the range half to once the thickness of the boundary layers.

In the variant of FIG. 6, the fins 350 are four in number and of axial dimensions that are less than or equal to 50% of the local axial length of the blade. They are situated close to the trailing edge 342 and the tip 344 of the blade. These fins are rectilinear.

Figure 7:
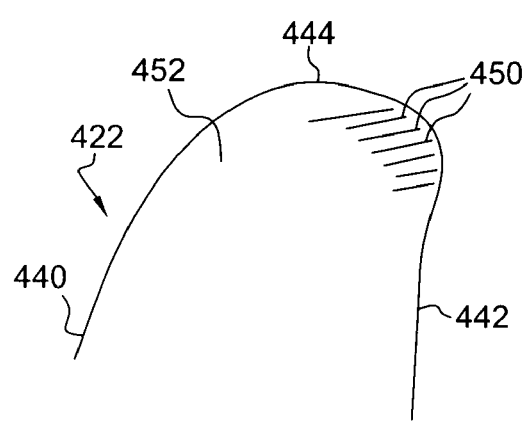

The blade of the variant of FIG. 7 has seven fins 450 that are parallel and rectilinear, of axial dimensions similar to the fins 350 of FIG. 6 and they are likewise located close to the trailing edge 442 and the tip 444 of the blade.

Figure 8:
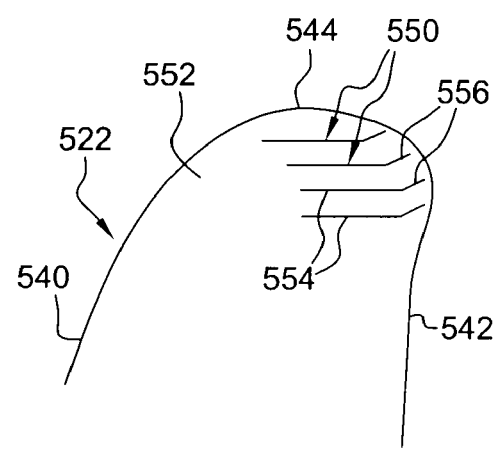

In the variant of FIG. 8, the blade has four parallel fins 550, each having a rectilinear upstream portion 554 that is substantially parallel to the longitudinal axis of the engine, and a curved downstream portion 556 forming a circular arc with its concave side facing outwards, and they extend outwards from the downstream ends of the rectilinear portions, on going from upstream to downstream. The circularly arcuate downstream end portions of the fins are connected to the trailing edge 542 of the blade.

Figure 9:
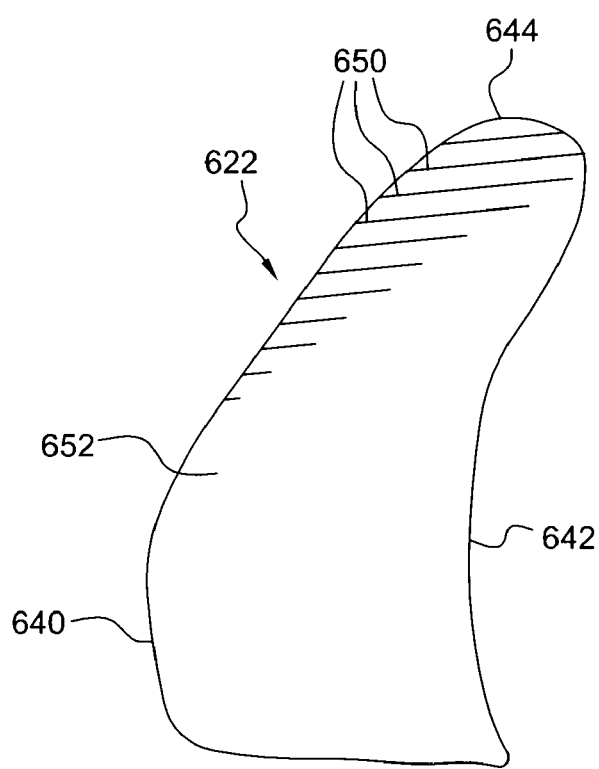
FIG. 9 is a diagrammatic side view of an upstream fan blade in another variant embodiment of the invention.

In the variant embodiment of FIG. 9, the blade carries a plurality of fins 650 that are regularly distributed over a zone occupying 50% to 95% of the radial dimension of the blade measured from the root of the blade. These fins 650 are rectilinear and parallel to one another. The axial dimension of the fins varies with the radial position of the fins on the blade, with the fins closer to the tip 644 of the blade presenting a longer axial dimension. The fins situated close to the blade tip 644 extend substantially from the leading edge 640 to the trailing edge 642 of the blade, i.e. along the entire local axial dimension of the blade.

This particular configuration for the fins 650 serves to channel the stream of air passing between the blades and to prevent it from rising to the blade tips where it would otherwise feed the above-mentioned vortices.

The guide fins of the invention may be made integrally with the blade or they may be fittings that are fastened thereon. By way of example, they may be made by casting, by machining, etc. They may be made of material that is composite, metallic, etc. They may also be fastened to the blade by adhesive, welding, brazing, etc.

In the examples shown, the fins are located on the suction sides of the blades. In a variant, the fins may also be located on the pressure sides of the blades or indeed solely on the pressure sides of the blades. They may also be present on a fraction only of the blades of the upstream fan 122. The fins may extend perpendicularly or in inclined manner relative to the outside surface of the suction side and/or pressure side of the blades.

In the examples shown, the pitch between the fins is substantially constant. Nevertheless, in other embodiments, the pitch may vary.

What is claimed is:

1. A turbomachine comprising:
   two unducted external fans mounted to contrarotate about a common axis, the fans constituting respectively an upstream fan and a downstream fan,
   wherein at least some of the blades of the upstream fan carry air guide means on radially outer end portions thereof, the air guide means being outwardly oriented on going from upstream to downstream and serving to deflect vortices that are formed in the vicinity of blade tips of the upstream fan radially to outside the blades of the downstream fan,
   wherein the air guide means of the blade includes at least one fin projecting from a suction side of the blade and/or at least one fin projecting from a pressure side of the blade, and
   wherein an axial length of each fin is less than an axial length of the blade and each fin is rectilinear.

2. A turbomachine according to claim 1, wherein each fin is formed integrally with the blade or is a fitting fastened thereto.

3. A turbomachine according to claim 1, wherein each fin has an axial dimension or length lying in the range about 20% to about 90% of the axial dimension or length of the blade.

4. A turbomachine according to claim 1, wherein each fin has a thickness or height that is approximately equal to the thickness of the boundary layer of the flow of air over the blade.

5. A turbomachine according to claim 1, wherein the blade carries a plurality of fins on at least one of its faces, the fins being substantially parallel to one another.

6. A turbomachine according to claim 5, wherein the fins are located close to the leading edge and/or the trailing edge of the blade.

7. A turbomachine according to claim 5, wherein the fins are distributed over a zone occupying about 50% to about 95% of the radial dimension of the blade as measured from the root of the blade, and are of varying length that increases progressively with increasing distance of the fins from the axis of rotation.

8. An external fan blade for a turbomachine according to claim 1, wherein, at its outer end, the fan blade includes air guide means which are formed by at least one or two parallel fins projecting from at least one of its faces and extending outwards on going from upstream to downstream.

9. A turbomachine comprising:
   two unducted external fans mounted to contratotate about a common axis, the fans constituting respectively an upstream fan and downstream fan,
   wherein at least some of the blades of the upstream fan carry air guide means on radially outer end portions thereof, the air guide means being outwardly oriented on going from upstream to downstream and serving to deflect vortices that are formed in the vicinity of blade tips of the upstream fan radially to outside the blades of the downstream fan,
   wherein the air guide means of the blade includes at least one fin projecting from a suction side of the blade and/or at least one fin projecting from a pressure side of the blade, and
   wherein an axial length of each fin is less than an axial length of the blade and each fin includes a rectilinear upstream portion parallel to an axis of the turbomachine and a curved downstream portion with a concave side facing outwards.

* * * * *

UNITED STATES PATENT AND TRADEMARK OFFICE
CERTIFICATE OF CORRECTION

PATENT NO.         : 8,221,081 B2
APPLICATION NO.    : 12/617222
DATED              : July 17, 2012
INVENTOR(S)        : Maxime Lebrun Page 1 of 1

It is certified that error appears in the above-identified patent and that said Letters Patent is hereby corrected as shown below:

Column 4, line 5, change "1" to --ℓ--; and

Column 6, line 16, change "contratotate" to --contrarotate--.

Signed and Sealed this
Eleventh Day of September, 2012

David J. Kappos
*Director of the United States Patent and Trademark Office*